(12) United States Patent
Tu et al.

(10) Patent No.: US 12,724,153 B2
(45) Date of Patent: Sep. 1, 2026

(54) DIRECT-TIME-OF-FLIGHT DEVICE, SYSTEM, AND METHOD

(71) Applicant: Taiwan Semiconductor Manufacturing Company, Ltd., Hsinchu (TW)

(72) Inventors: Hung-Yi Tu, Hsinchu City (TW); Meng-Hsiu Wu, Hsinchu (TW); Shang-Fu Yeh, Hsinchu City (TW); Chih-Lin Lee, Miaoli County (TW); Chin Yin, Tainan City (TW)

(73) Assignee: Taiwan Semiconductor Manufacturing Company, Ltd., Hsinchu (TW)

( * ) Notice: Subject to any disclaimer, the term of this patent is extended or adjusted under 35 U.S.C. 154(b) by 691 days.

(21) Appl. No.: 18/318,662

(22) Filed: May 16, 2023

(65) Prior Publication Data

US 2024/0385325 A1 Nov. 21, 2024

(51) Int. Cl.

| | |
|---|---|
| ***G01C 3/08*** | (2006.01) |
| ***G01S 7/484*** | (2006.01) |
| ***G01S 7/4863*** | (2020.01) |
| ***G01S 17/894*** | (2020.01) |

(52) U.S. Cl.

CPC ............ *G01S 17/894* (2020.01); *G01S 7/484* (2013.01); *G01S 7/4863* (2013.01)

(58) Field of Classification Search

CPC ....... G01S 17/894; G01S 7/484; G01S 7/4863

See application file for complete search history.

(56) References Cited

U.S. PATENT DOCUMENTS

| | | | | |
|---|---|---|---|---|
| 7,262,402 B2 * | 8/2007 | Niclass | ................. | H10F 30/225 250/214 R |
| 2021/0092275 A1 * | 3/2021 | Gnecchi | .................. | G06T 7/521 |
| 2022/0113407 A1 * | 4/2022 | Wang | ...................... | G01S 17/08 |

FOREIGN PATENT DOCUMENTS

| | | | | |
|---|---|---|---|---|
| CN | 107333040 A * | 11/2017 | ............. | H04N 23/50 |

* cited by examiner

*Primary Examiner* — Mark Hellner
(74) *Attorney, Agent, or Firm* — JCIPRNET

(57) ABSTRACT

A direct-time-of-flight (dTOF) detecting device is provided. The dTOF detecting device includes a single-photon avalanche diode (SPAD) sensor and a processor. The SPAD sensor is configured to receive a reflective light reflected from an object and output an original data based on the reflective light. The processor is coupled to the SPAD sensor and configured to process the original data to generate depth data and intensity data. The depth data includes depth information of the object and the intensity data includes a two-dimensional image of the object.

20 Claims, 12 Drawing Sheets

DIRECT-TIME-OF-FLIGHT DEVICE, SYSTEM, AND METHOD

BACKGROUND

Technical Field

The disclosure relates to a direct-time-of-flight device; particularly, the disclosure relates to a direct-time-of-flight device, a direct-time-of-flight system, and a direct-time-of-flight method.

Description of Related Art

Time-of-Flight (TOF) is a method for measuring the distance between a sensor and an object, based on the time difference between the emission of a signal and its return to the sensor after being reflected by an object. That is, TOF is able to realize depth sensing, which is also known as range sensing. TOF sensors are highly advanced light detection and ranging (LIDAR) devices which replace the standard point by point scanning laser beams with a single light pulse to achieve full spatial awareness. TOF measurement of a ray of light generated by a mono-chromatic or wide-spectral light source can be also used in applications, such as 3D imaging. In other words, TOF sensors can be implemented to track facial or hand movements, map out a room and navigate a self-driving vehicle, etc.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
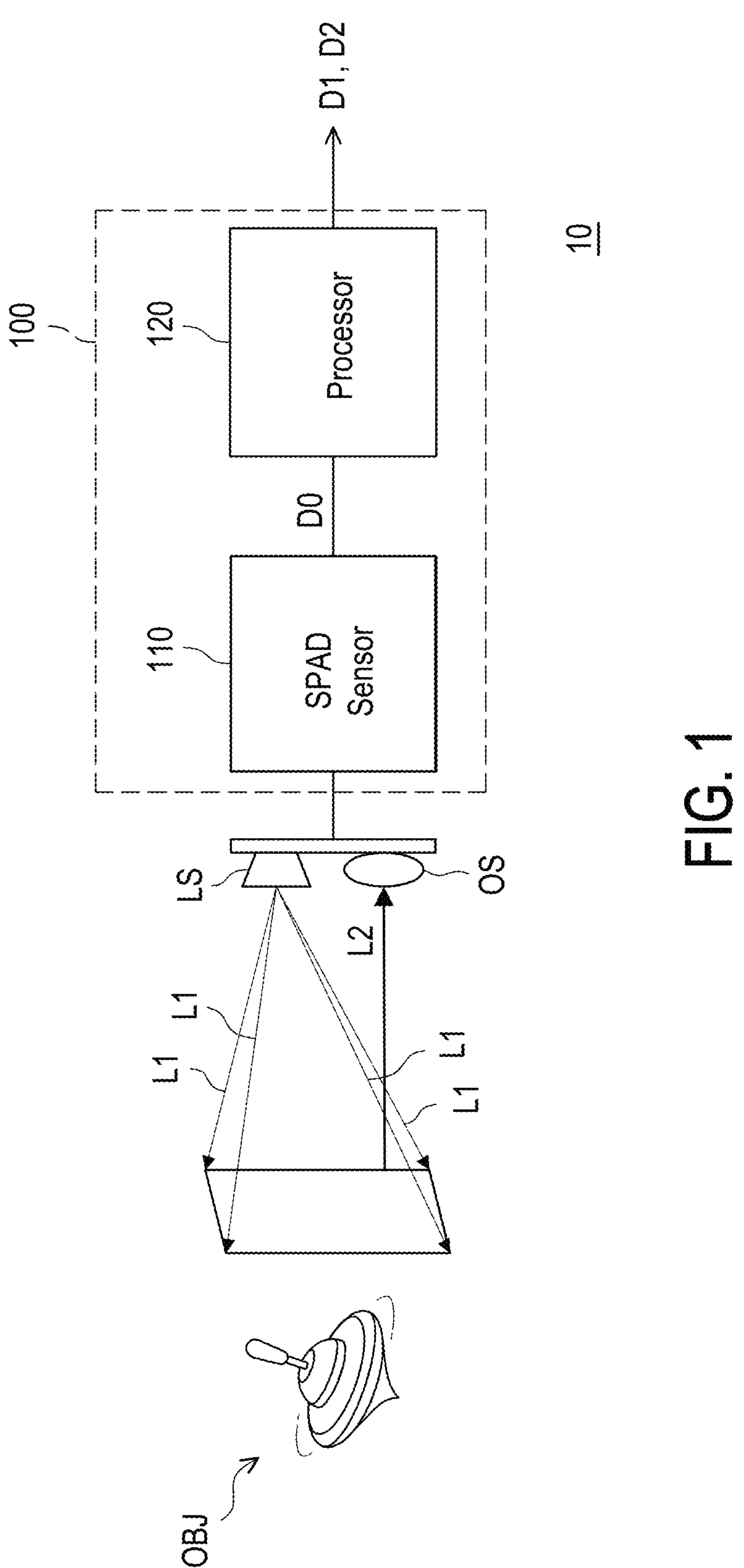
FIG. 1 is a schematic diagram of a dTOF detecting system according to an embodiment of the disclosure.

Reference will now be made in detail to the exemplary embodiments of the disclosure, examples of which are illustrated in the accompanying drawings. Whenever possible, the same reference numbers are used in the drawings and the description to refer to the same or like components.

Certain terms are used throughout the specification and appended claims of the disclosure to refer to specific components. Those skilled in the art should understand that electronic device manufacturers may refer to the same components by different names. This article does not intend to distinguish those components with the same function but different names. In the following description and rights request, the words such as "comprise" and "include" are open-ended terms, and should be explained as "including but not limited to . . . ".

The term "coupling (or connection)" used throughout the whole specification of the present application (including the appended claims) may refer to any direct or indirect connection means. For example, if the text describes that a first device is coupled (or connected) to a second device, it should be interpreted that the first device may be directly connected to the second device, or the first device may be indirectly connected through other devices or certain connection means to be connected to the second device. The terms "first", "second", and similar terms mentioned throughout the whole specification of the present application (including the appended claims) are merely used to name discrete elements or to differentiate among different embodiments or ranges. Therefore, the terms should not be regarded as limiting an upper limit or a lower limit of the quantity of the elements and should not be used to limit the arrangement sequence of elements. In addition, wherever possible, elements/components/steps using the same reference numerals in the drawings and the embodiments represent the same or similar parts. Reference may be mutually made to related descriptions of elements/components/steps using the same reference numerals or using the same terms in different embodiments.

It should be noted that in the following embodiments, the technical features of several different embodiments may be replaced, recombined, and mixed without departing from the spirit of the disclosure to complete other embodiments. As long as the features of each embodiment do not violate the spirit of the disclosure or conflict with each other, they may be mixed and used together arbitrarily.

Time-of-Flight (TOF) is a method for measuring the distance between a sensor and an object, based on the time difference between the emission of a signal and its return to the sensor after being reflected by an object. That is, TOF is able to realize depth sensing, which is also known as range sensing. TOF sensors are highly advanced light detection and ranging (LIDAR) devices which replace the standard point by point scanning laser beams with a single light pulse to achieve full spatial awareness. TOF measurement of a ray of light generated by a mono-chromatic or wide-spectral light source can be also used in applications, such as 3D imaging. For example, TOF sensors can be implemented to track facial or hand movements, map out a room and navigate a self-driving vehicle, etc.

TOF measurement is based on a detection of a light which is reflected by the target from a light source to a detector. There exist at least two techniques to measure the TOF: a direct method and an indirect method. In the direct method, the time difference between a START pulse, synchronized with the light source, and a STOP signal generated by the detector is evaluated. In the indirect method, a continuous sinusoidal light wave is emitted and the phase difference between outgoing and incoming signals is measured, which is used to determine the time difference using a predefined algorithm.

It is noted that, a TOF sensor may utilize time-correlated single photon counting (TCSPC) methodology to achieve a high precision rate of depth sensing of the target. However, the TOF sensor utilizing the TCSPC methodology may not be able to provide a grayscale image of the target. On the other hand, an image sensor may be able to provide a grayscale image of the target. However, the image sensor is not able to provide depth information of the target.

A single-photon avalanche diode (SPAD) is a solid-state photodetector, in which, through an internal photoelectric effect, a photon-generated carrier can trigger a short-duration but relatively large avalanche current. That is, when a photon is received, avalanche current indicating the detection is generated. This avalanche current is created through a mechanism called impact ionization, in which, electrons and/or holes, as carriers, are accelerated to high kinetic energies through a large potential gradient. If the kinetic energy of a received electron, or a hole, is large enough (as a function of the ionization energy of the bulk material), additional carriers (electrons and/or holes) are liberated from the atomic lattice. As a result, the number of carriers increases exponentially from as few as a single carrier to create the avalanche current. SPAD is capable of detecting different types of low-intensity ionizing radiation, including: gamma, X-ray, beta, and alpha-particle radiation along with electromagnetic signals in the UV, Visible and IR down to the single photon level. SPADs are also capable of distinguishing the arrival times of events (photons) at high accuracy with a timing jitter of only a few tens of picoseconds. SPADs have recently been implemented in LIDAR, TOF 3D Imaging, positron emission tomography (PET) scanning, single-photon experimentation, fluorescence lifetime microscopy and optical communications, particularly quantum key distribution.

For example, a SPAD may be integrated with a pulse laser to achieve depth sensing utilizing the TSCPS methodology and a SPAD may be integrated with a continuous light source to achieve image sensing utilizing a sensitivity-boosting technique. However, since the depth sensing and the image sensing of the SPAD require different kind of light sources, the depth sensing and the image sensing of the SPAD cannot be performed at the same time. Further, both of the depth sensing and the image sensing of the SPAD require large amount of data or long integration time. That is, the depth sensing and the image sensing of the SPAD may need to be performed separately, which increases the processing time and decreases the performance of the whole system. Therefore, how to develop a convenient and effective method to perform both the depth sensing and the image sensing is becoming an issue to work on.

FIG. 1 is a schematic diagram of a dTOF detecting system according to an embodiment of the disclosure. Referring to FIG. 1, a dTOF detecting system 10 may include an object OBJ, a dTOF detecting device 100, a light source LS, and an optical system OS.

In one embodiment, the dTOF detecting device 100 may include a SPAD sensor 110 and a processor 120. The light source LS may be configured to emit at least one incident light L1 towards the object OBJ. The optical system may be configured to receive at least one reflective light L2 after the incident light L1 being reflected by the object OBJ and provide the reflective light L2 to the SPAD sensor 110. That is, the SPAD sensor 110 may be configured to receive the reflective light L2 reflected from the object OBJ. Further, the SPAD sensor 110 may be configured to output an original data D0 based on the reflective light L2. The processor 120 may be coupled to the SPAD sensor 110 and configured to receive the original data D0 from the SPAD sensor 120. Further, the processor 120 may be configured to process the original data D0 to generate depth data D1 and intensity data D2. The depth data D1 may include depth information of the object OBJ and the intensity data D2 may include a two-dimensional image of the object. In this manner, the dTOF detecting device 100 is able to perform both the depth sensing and the image sensing simultaneously, thereby saving the processing time and increasing the performance of the whole system.

In one embodiment, the light source LS may include a laser light source that emits laser pulses to the object OBJ, but the disclosure is not limited to any specific type of light source LS.

In one embodiment, the light source LS may be a visible laser source which is visible to the human eyes, so the incident light L1 may be directly observed with the human eyes. In one embodiment, the light source LS may be a near infrared (NIR) laser source which is invisible to the human eyes, so the incident light may not cause damage to the human eyes and the depth sensing and the image sensing may be performed silently. However, this disclosure is not limited thereto.

In one embodiment, the optical system OS may include, for example, a lens, a complementary metal oxide semiconductor (CMOS) camera, a charge coupled device (CCD) camera, or a combination of the elements. However, this disclosure is not limited thereto.

In one embodiment, the processor 120 includes, for example, a microcontroller unit (MCU), a central processing unit (CPU), a microprocessor, a digital signal processor (DSP), a programmable controller, a programmable logic device (PLD), other similar devices, or a combination of the devices. The disclosure is not limited thereto. In addition, in an embodiment, each of functions of the processor 120 may be achieved as multiple program codes. The program codes are stored in a memory, and executed by the processor 120. Alternatively, in an embodiment, each of the functions of the processor 120 may be achieved as one or more circuits. The disclosure does not limit the use of software or hardware to achieve the functions of the processor 120.

It is noted that, due to the characteristic of the SPAD, a photon detection efficiency (PDE) is defined as a probability of a photon detected by the SPAD. Normally, the PDE is under 100%, which means not every photon will trigger the avalanche of the SPAD. Further, the PDE also differs based on the choice of the light source LS and the structure of the SPAD. Therefore, in order to obtain enough data that the SPAD is avalanched for either the depth sensing or the image sensing, over-sampling techniques are used to reduce the uncertainty.

In one embodiment, the original data D0 output from the SPAD sensor 110 may be categorized into three parts: a valid part, an invalid part, and a noise part. The noise part may be the data induced by the ambient light, which may be reduced or eliminated through statistical techniques. The valid part may be defined as the data received while the SPAD sensor 110 is avalanched due to the reflective light L2. The invalid part may be defined as the data received while the SPAD sensor 110 is not avalanched due to the reflective light L2. That is, the valid part is configured to indicate the SPAD sensor 110 is avalanched and the invalid part is configured to indicate the SPAD sensor 110 is not avalanched.

In one embodiment, the processor 120 may be configured to process the original data D0 to generate the valid part of the original data D0 and the invalid part of the original data D0. Further, the processor 120 may be configured to process the valid part of the original data D0 to obtain depth information of the object OBJ, so the valid part of the original data D0 may be also called "depth data D1".

It is noted that, although the reflective light L2 corresponding to the invalid part of the original data D0 may not cause the avalanche of the SPAD sensor 110, the reflective light L2 corresponding to the invalid part of the original data D0 may still bring back a grayscale information or color information of the object OBJ. For example, while the incident light L1 hits a darker part of the object OBJ, the density of the photons in the reflective light L2 will be lower.

On the other hand, while the incident light L1 hits a lighter part of the object OBJ, the density of the photons in the reflective light L2 will be higher. That is, the processor 120 may be further configured to process the invalid part of the original data D0 to obtain a two-dimensional image of the object OBJ, so the invalid part of the original data D0 may be also called "intensity data D2".

In short, the processor 120 may be configured to process the original data D0 to generate the depth data D1 and the intensity data D2. Specifically, the processor may be configured to generate the depth data based on the valid part of the original data D0 and generate the intensity data D2 based on the invalid part of the original data D0. The depth data D1 may include depth information of the object OBJ and the intensity data D2 may include a two-dimensional image of the object OBJ. In this manner, the dTOF detecting device 100 is able to perform both the depth sensing and the image sensing simultaneously, thereby saving the processing time and increasing the performance of the whole system.

Figure 2:
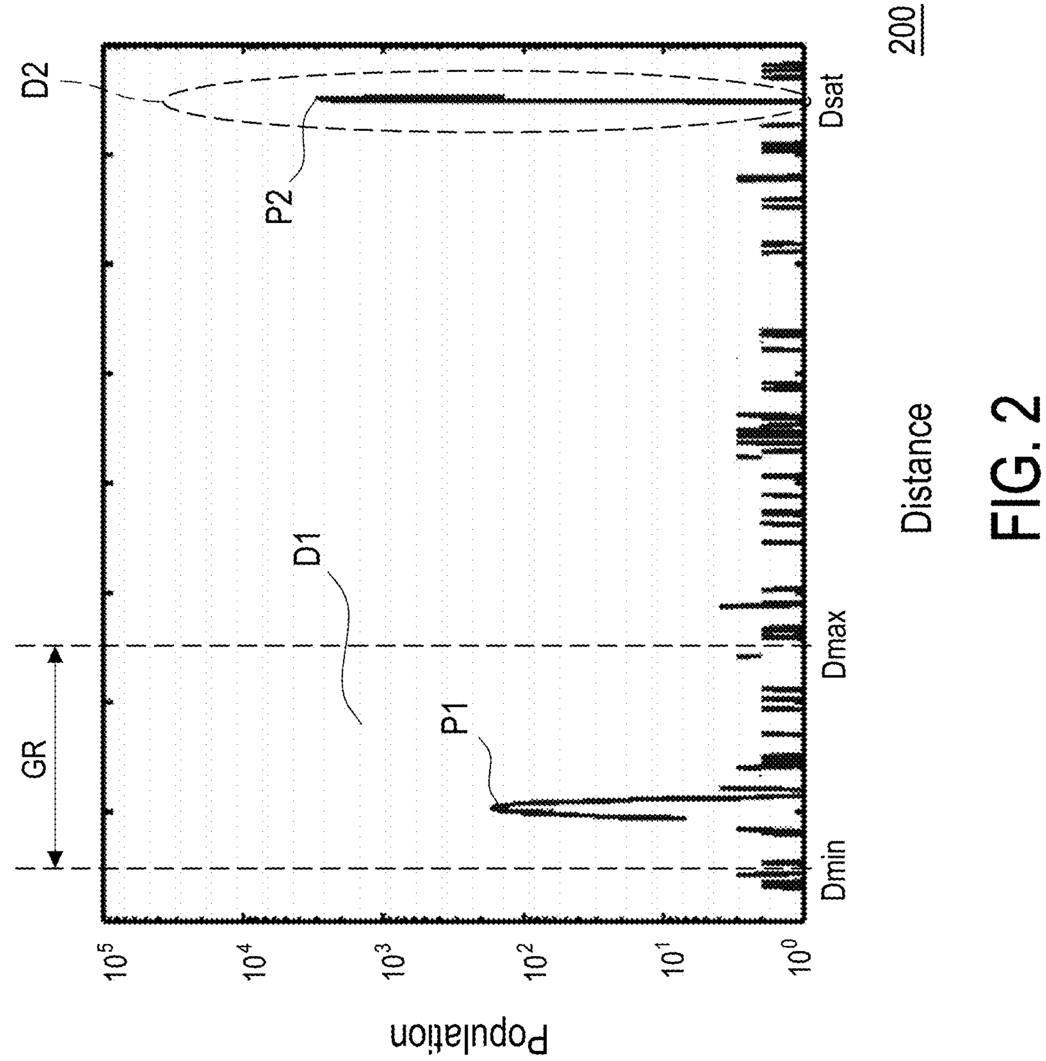
FIG. 2 is a schematic diagram of original data of a TOF measurement according to an embodiment of the disclosure.

FIG. 2 is a schematic diagram of original data of a TOF measurement according to an embodiment of the disclosure. Referring to FIG. 1 and FIG. 2, the original data D0 of a TOF measurement may be presented as a histogram 200. In one embodiment, the processor 120 may be configured to receive the original data D0, convert the original data D0 from timing data to digital data, and generate the histogram 200 by histogramming the digital data. However, this disclosure is not limited thereto. The horizontal axis of the histogram 200 may represent a distance from the dTOF detecting device 100 to the object OBJ. The vertical axis of the histogram 200 may represent a population (count) of the data at a certain distance.

Further, the histogram 200 of the original data D0 may include the depth data D1, the intensity data D2, and noise data. The noise data may be the data induced by the ambient light, which may be reduced or eliminated through statistical techniques well-known in the art, while the details are not redundantly described seriatim herein.

The depth data D1 may include a valid data distribution within a gating range GR and the valid data distribution may include a peak P1. The gating range GR may include a minimum distance Dmin and a maximum distance Dmax.

In one embodiment, the minimum distance Dmin and the maximum distance Dmax may be predetermined according to design needs, but this disclosure is not limited thereto. For example, the dTOF detecting device 100 may be integrated into a vehicle and may be used to detect objects within a range of 50 centimeters to 2 meters. That is, the minimum distance Dmin may be 50 centimeters and the maximum distance Dmax may be 2 meters. On the other hands, the data outside the gating range GR may be regarded as the noise data or the intensity data. That is, the maximum distance Dmax and the minimum distance Dmin may be predetermined based on a detecting distance of the dTOF detecting device 100. Further, the processor 120 may be configured to filter the original data D0 within the gating range GR to generate the depth data D1 and filter the original data D0 outside the gating range GR to generate the intensity data D2. In one embodiment, the minimum distance Dmin and the maximum distance Dmax may be determined by the processor 120 through searching a peak with a profile distribution in the histogram 200, but this disclosure is not limited thereto. That is, the maximum distance Dmax and the minimum distance Dmin may be determined according to two boundaries of the profile distribution. In other words, the range of the gating range GR may be predetermined according to design need or determined by the processor 120 and this disclosure does not limit how the gating range is generated.

The intensity data D2 may include a peak P2 near the end of the histogram 200. While the SPAD is not avalanched due to the reflective light L2, the SPAD sensor 110 may send a saturation signal to the processor 120 at the end of each of the detection period of the dTOF detecting device 100. In one embodiment, the timing of sending the saturation signal may be same as the end of the detection period or a bit earlier than the end of the detection period. However, this disclosure is not limited thereto. That is, at a saturation distance Dsat near the end of the histogram 200, the peak P2 may represent the count of the invalid part (the intensity data D2) of the original data D0. In other words, the processor 120 may be configured to detect a saturation peak (i.e., the peak P2) near the end of the original data D0 and determine the saturation peak as the intensity data D2.

In this manner, the processor 120 is able to categorize the original data D0 into three parts: the valid part (the depth data D1), the invalid part (the intensity data D2), and the noise part. Therefore, the dTOF detecting device 100 is able to perform both the depth sensing and the image sensing simultaneously, thereby saving the processing time and increasing the performance of the whole system.

Figure 3:
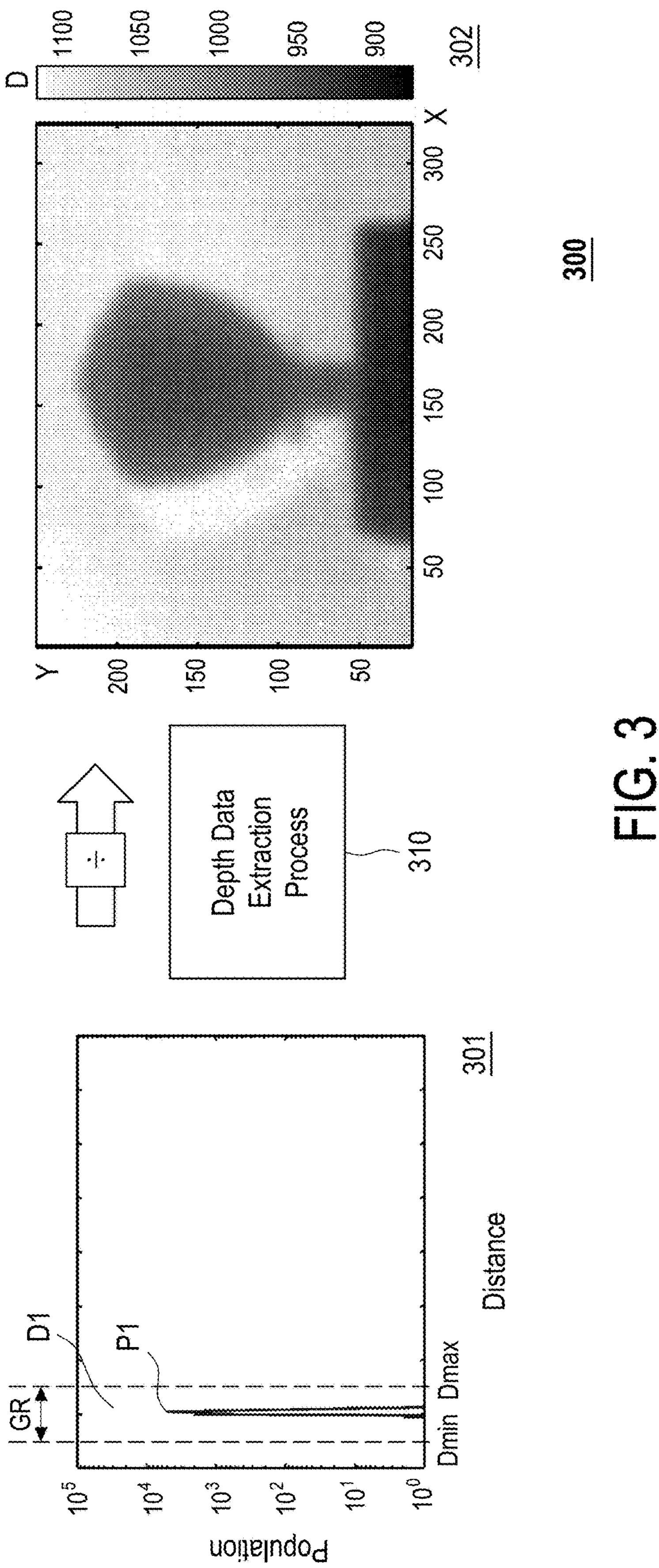
FIG. 3 is a schematic diagram of a depth data extraction scenario of a TOF measurement according to an embodiment of the disclosure.

FIG. 3 is a schematic diagram of a depth data extraction scenario of a TOF measurement according to an embodiment of the disclosure. Referring to FIG. 1 to FIG. 3, the depth data extraction scenario 300 may include a histogram 301, a depth image 302, and a depth data extraction process 310. The histogram 301 may represent the depth data D1 of a TOF measurement and the depth image 302 may represent the depth information of the object OBJ extracted from the depth data D1. The depth data extraction process 310 may represent the process of extracting the depth information from the histogram 301 (the depth data (D1).

Referring to the histogram 301 first, the horizontal axis of the histogram 301 may represent a distance from the dTOF detecting device 100 to the object OBJ. The vertical axis of the histogram 301 may represent a population (count) of the data at a certain distance. Further, the histogram 301 may only include the depth data D1 after removing the invalid part (the intensity data D2) and the noise part of the original data D0 from the histogram 200. The depth data D1 may include the valid data distribution within the gating range GR and the valid data distribution may include the peak P1. The gating range GR may include the minimum distance Dmin and the maximum distance Dmax.

Referring to the depth image 302 now, the horizontal axis of the depth image 302 may represent a direction X perpendicular to a direction from the dTOF detection device 100 to the object OBJ. The vertical axis of the depth image 302 may represent a direction Y perpendicular to a direction from the dTOF detection device 100 to the object OBJ and the direction X. In addition, on the right hand side of the depth image 302, a gradient pattern may represent a detected distance D from the dTOF detection device 100 to the object OBJ, which is detected by the dTOF detection device 100. For example, the lightest color may indicate the detected distance D is 1100 units and the darkest color may indicate the detected distance D is 900 units. However, this disclosure is not limited thereto.

The depth data extraction process 310 may represent the process of extracting the depth information from the histogram 301 (the depth data D1). In one embodiment, the depth data extraction process 310 may be, for example, an average value method, a median value method, a peak value finding method, or the combination of the aforementioned method, but this disclosure is not limited thereto. That is, the depth data extraction process 310 may be achieved by finding an average value, a median value, or a peak value of the valid data distribution, but this disclosure is not limited thereto. In one embodiment, the depth data extraction process 310 may be achieved as a program code. The program code may be stored in a memory, and executed by the processor 120. Alternatively, in an embodiment, the depth data extraction process 310 may be achieved by an average value circuit, a median value circuit, a peak finder circuit, or the combination of the aforementioned circuits, but this disclosure is not limited thereto. This disclosure does not limit the use of software or hardware to achieve the depth data extraction process 310.

In this manner, by filtering the original data D0 within the gating range GR, the dTOF detecting device 100 is able to extract the depth data D1 from the original data D0, thereby suppressing the influence of the noise data and improving the accuracy.

Figure 4:
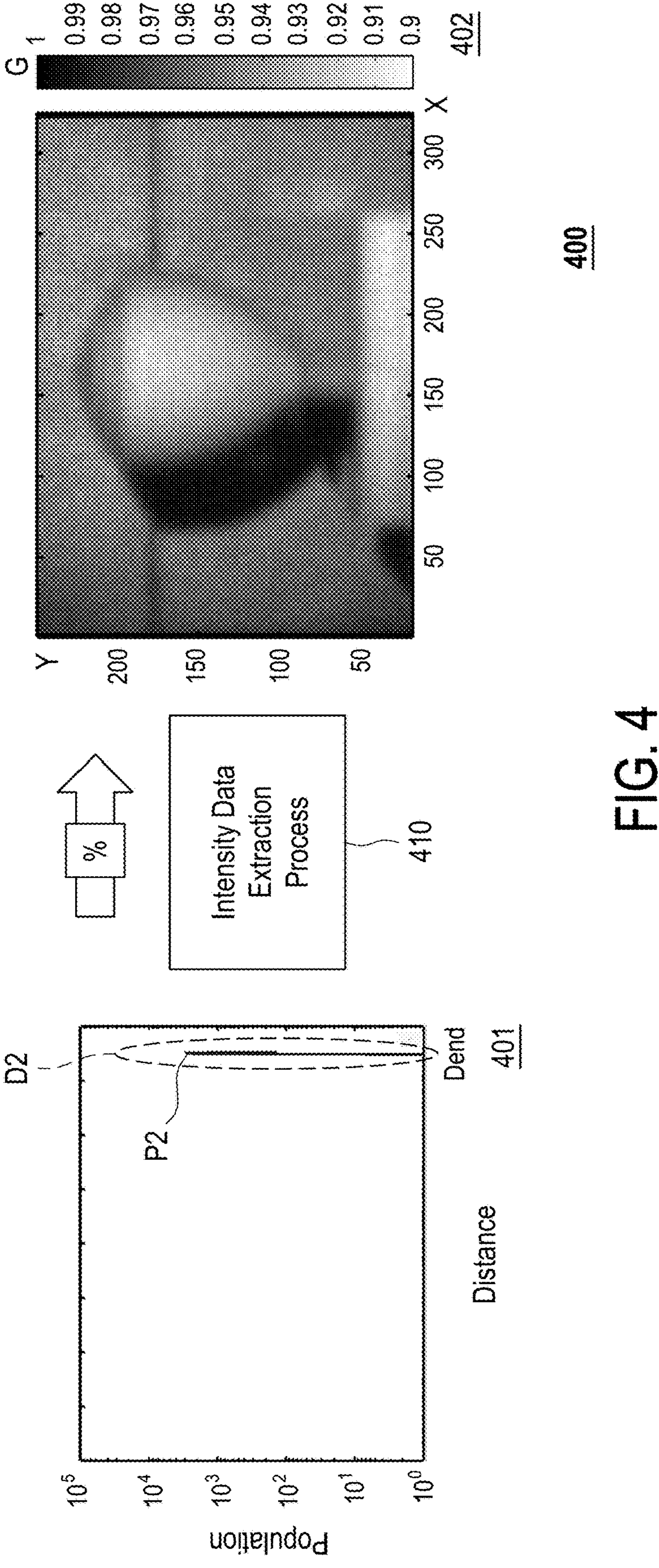
FIG. 4 is a schematic diagram of intensity data extraction scenario of a TOF measurement according to an embodiment of the disclosure.

FIG. 4 is a schematic diagram of intensity data extraction scenario of a TOF measurement according to an embodiment of the disclosure. Referring to FIG. 1 to FIG. 4, the depth data extraction scenario 400 may include a histogram 401, an intensity image 402, and an intensity data extraction process 410. The histogram 401 may represent the intensity data D2 of a TOF measurement and the intensity image 402 may represent the two-dimensional image of the object OBJ extracted from the intensity data D2. The intensity data extraction process 410 may represent the process of extracting the two-dimensional image of the object OBJ from the histogram 401 (the intensity data D2).

Referring to the histogram 401 first, the horizontal axis of the histogram 401 may represent a distance from the dTOF detecting device 100 to the object OBJ. The vertical axis of the histogram 401 may represent a population (count) of the data at a certain distance. Further, the histogram 401 may only include the intensity data D2 after removing the valid part (the depth data D1) and the noise part of the original data D0 from the histogram 200. The intensity data D2 may include the peak P2 at a saturation distance Dend near the end of the histogram 401.

Referring to the intensity image 402 now, the horizontal axis of the depth image 402 may represent the direction X perpendicular to the direction from the dTOF detection device 100 to the object OBJ. The vertical axis of the depth image 402 may represent the direction Y perpendicular to the direction from the dTOF detection device 100 to the object OBJ and the direction X. In addition, on the right hand side of the depth image 402, a gradient pattern may represent a grayscale value G of the object OBJ, which is detected by the dTOF detection device 100. For example, a resolution of the grayscale value G may include 1024 bits. That is, there are 1024 variations of the grayscale value G. The grayscale value G may be normalized to be presented as a percentage, such as 0 (0%) to 1 (100%). While the grayscale value G is smaller, the color of the object OBJ is lighter. While the grayscale value G is larger, the color of the object OBJ is darker. In one embodiment, the smallest value of the grayscale value G may indicate the color of the object OBJ is pure white, while the largest value of the grayscale value G may indicate the color of the object OBJ is pure black. However, this disclosure is not limited thereto.

The intensity data extraction process 410 may represent the process of extracting the two-dimensional image of the object OBJ from the histogram 401 (the intensity data D2). In one embodiment, the intensity data extraction process 410 may be, for example, a normalization and weighting method, but this disclosure is not limited thereto. That is, the two-dimensional image of the object OBJ may be extracted from the histogram 401 (the intensity data D2) by normalizing the grayscale value G. In one embodiment, the intensity data extraction process 410 may be achieved as a program code. The program code may be stored in a memory, and executed by the processor 120. Alternatively, in an embodiment, the intensity data extraction process 410 may be achieved by a normalization and weighting circuit, but this disclosure is not limited thereto. This disclosure does not limit the use of software or hardware to achieve the intensity data extraction process 410.

In addition, the intensity data extraction process 410 may be calibrated by using an invalid rate. The SPAD sensor 110 may be configured to receive the reflective light L2 frame by frame for a first number (also known as a frame number) of times. That is, the original data D0 may include a first number of the reflective lights L2. Among the first number of the reflective lights L2, a second number (also known as a valid number) of the reflective lights L2 may trigger the avalanche of the SPAD sensor 110 and a third number (also known as an invalid number) of the reflective lights L2 may not trigger the avalanche of the SPAD sensor 110. The invalid rate may be defined as dividing the third number (the invalid number) by the first number (the frame number). After the calibration, the normalization of the grayscale value G may be more accurate.

In this manner, by filtering the original data D0 outside the gating range GR, the dTOF detecting device 100 is able to extract the intensity data D2 from the original data D0, thereby suppressing the influence of the noise data and improving the accuracy.

Figure 5:
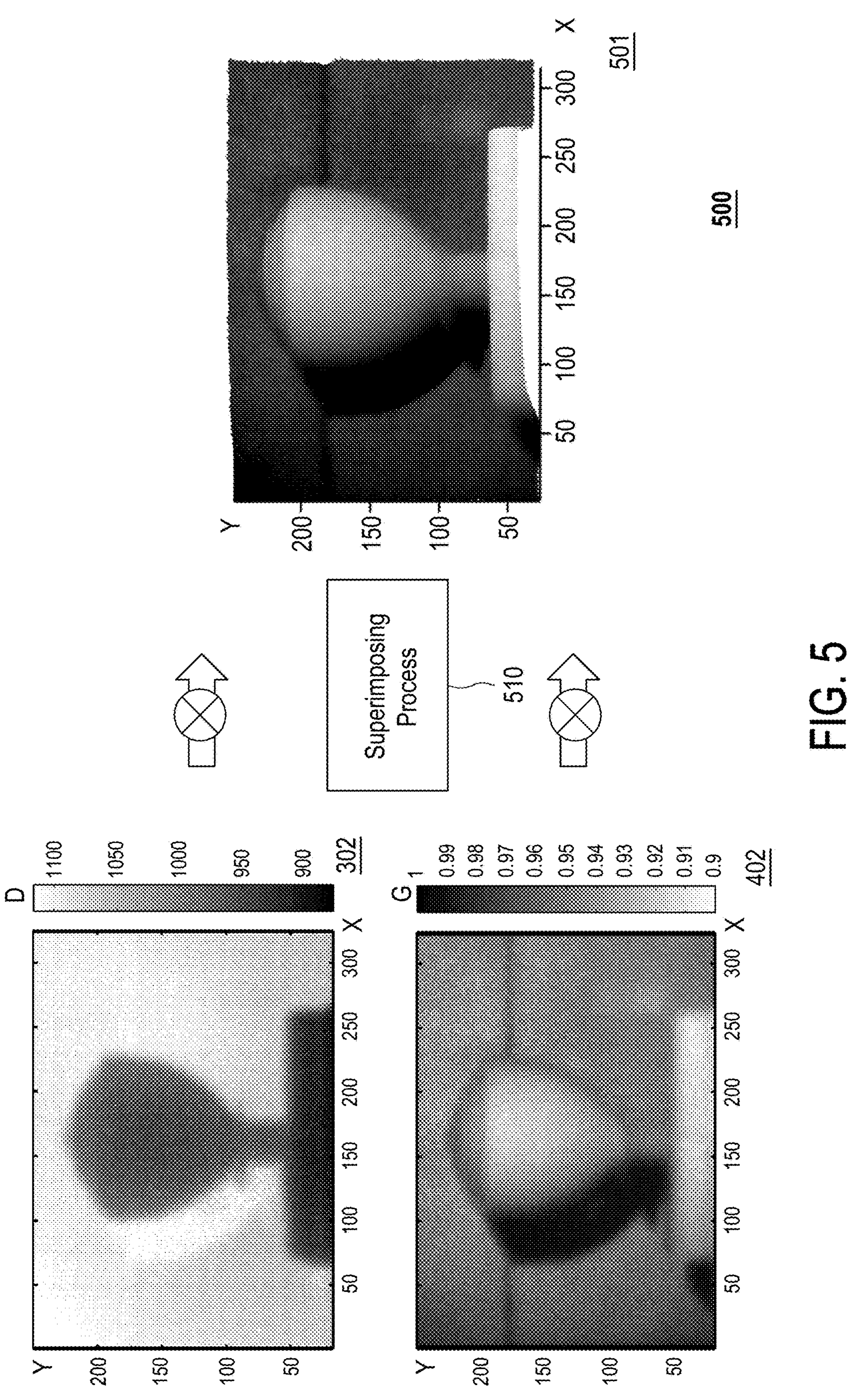
FIG. 5 is a schematic diagram of a superimposing scenario of a TOF measurement according to an embodiment of the disclosure.

FIG. 5 is a schematic diagram of a superimposing scenario of a TOF measurement according to an embodiment of the disclosure. Referring to FIG. 1 to FIG. 5, the superimposing scenario 500 may include the depth image 302, the intensity image 402, a superimposed depth image 501, and a superimposing process 510. The superimposed depth image 501 may represent an image obtained by superimposing the depth image 302 and the intensity image 402. The superimposing process 510 may represent the process of superimposing the depth image 302 and the intensity image 402. That is, the processor 120 may be configured to generate the superimposed depth image 501 of the object OBJ by superimposing the depth information of the object OBJ with the two-dimensional image of the object OBJ. The details of the depth image 302 and the intensity image 402 may be refereed to descriptions of FIG. 3 and FIG. 4, while the details are not redundantly described seriatim herein.

Referring to the superimposed depth image 501, the horizontal axis of the superimposed depth image 501 may represent the direction X perpendicular to the direction from the dTOF detection device 100 to the object OBJ. The vertical axis of the superimposed depth image 501 may represent the direction Y perpendicular to the direction from the dTOF detection device 100 to the object OBJ and the direction X. As shown in the superimposed depth image 501, a visual depth of the object OBJ in the superimposed depth image 501 may be same as the depth information of the depth image 302. Further, the details of the depth image 302 may be enhanced by the two-dimensional image of the intensity image 402 so as to generate the superimposed depth image 501. Therefore, the details of the depth image 302 may be enhanced by the two-dimensional image of the intensity image 402 so as to generate the superimposed depth image 501. It is noted that, the object OBJ of the superimposed depth image 501 may be same or similar as the object OBJ seen by the human eyes. Thus, the superimposed depth image 501 may be also called a human vision image.

In one embodiment, the SPAD sensor 110 may include a plurality of pixels. The superimposing process 510 may be achieved by multiplying each pixel of the depth image 302 with each pixel of the intensity image 402 correspondingly. That is, the detected distance D of the depth image 302 may be multiplied by the grayscale value G pixel by pixel. After the multiplication, a superimposed depth value of each pixel of the superimposed depth image 501 may be obtained. However, this disclosure is not limited thereto.

In this manner, the dTOF detecting device 100 is able to perform both the depth sensing and the image sensing simultaneously, thereby saving the processing time and increasing the performance of the whole system.

Figure 6A:
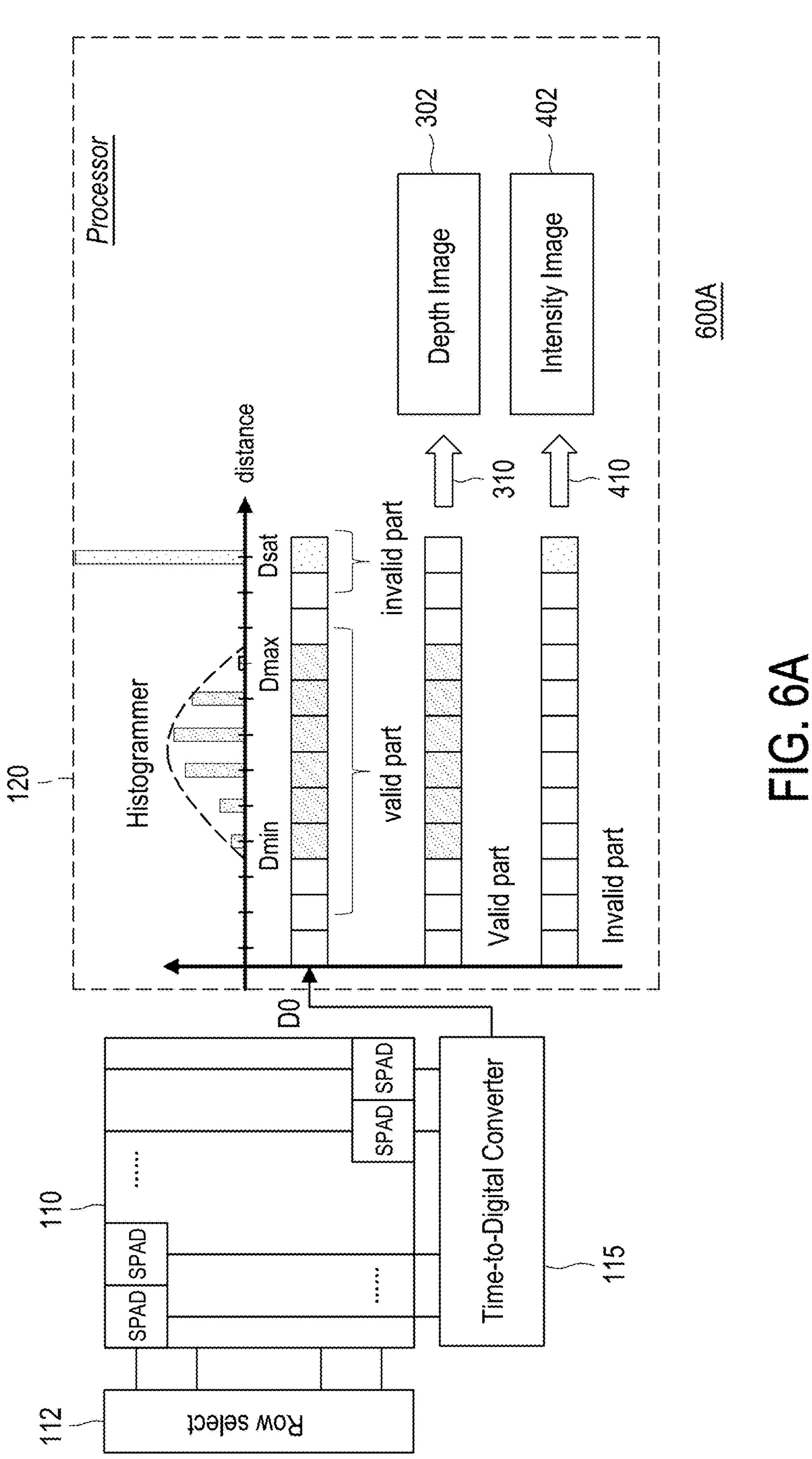
FIG. 6A is a schematic circuit structure of a dTOF detecting device to an embodiment of the disclosure.
Figure 6B:
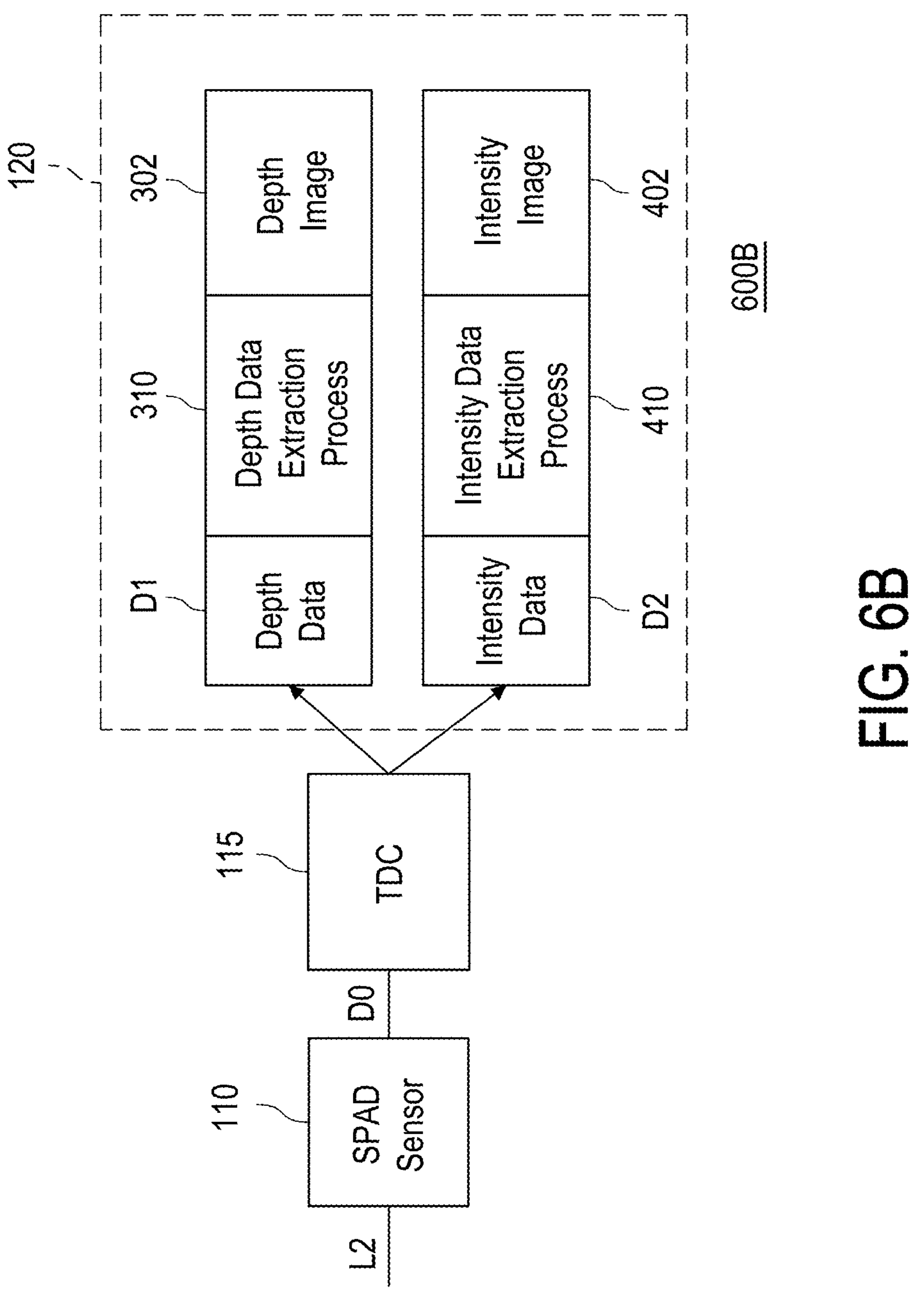
FIG. 6B is a schematic data flow diagram of a dTOF detecting device to an embodiment of the disclosure.
Figure 6C:
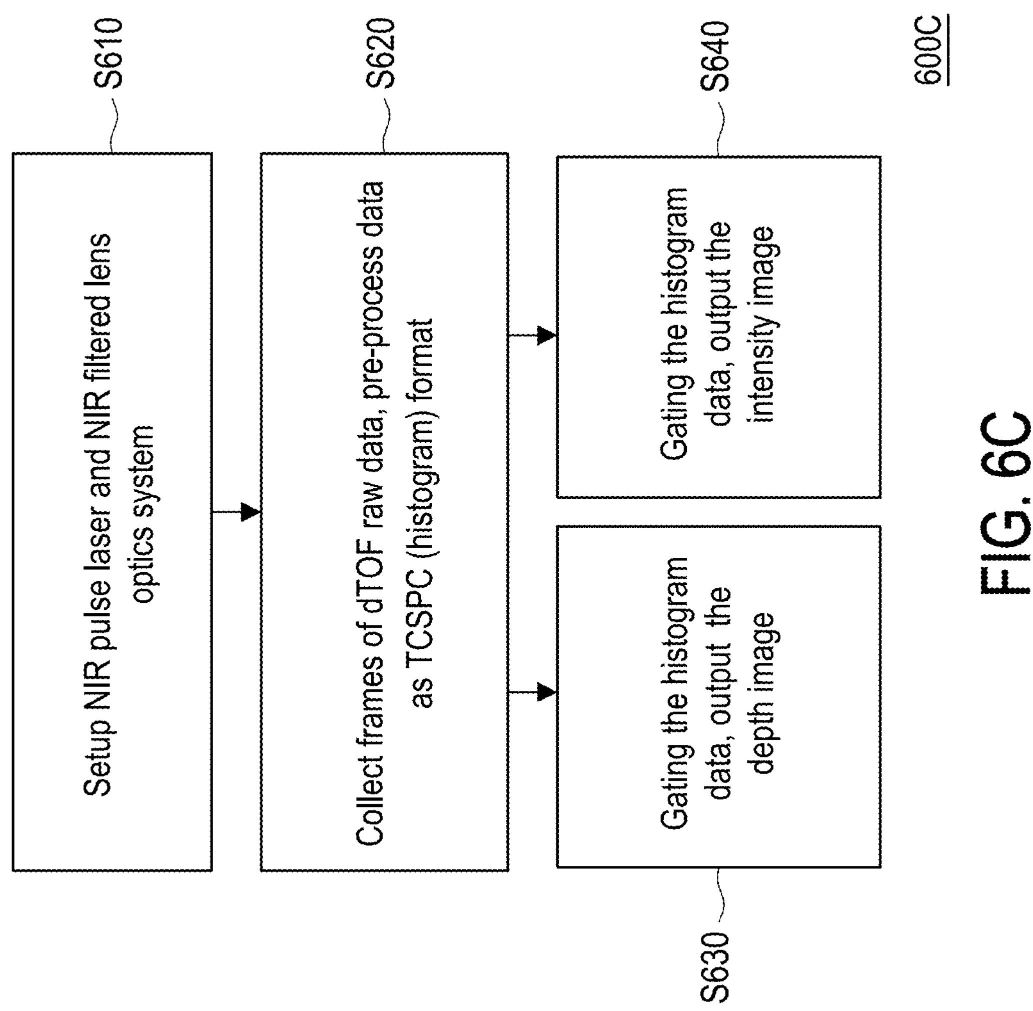
FIG. 6C is a schematic flowchart of a dTOF detecting device to an embodiment of the disclosure.

FIG. 6A is a schematic circuit structure of a dTOF detecting device to an embodiment of the disclosure. FIG. 6B is a schematic data flow diagram of a dTOF detecting device to an embodiment of the disclosure. FIG. 6C is a schematic flowchart of a dTOF detecting device to an embodiment of the disclosure.

Referring to FIG. 6A, a circuit structure 600A of the dTOF detecting device 100 may include the SPAD sensor 110, a row select circuit 112, a time-to-digital converter (TDC) 115, and the processor 120. The SPAD sensor 110 may include a SPAD array and the SPAD array may include a plurality of SPADs arranged in rows and columns. Each of the plurality of SPADs may correspond to a pixel of the SPAD sensor 110. Each row of the SPAD array may be coupled to the row select circuit 112 and each column of the SPAD array may be coupled to the TDC 115. The TDC 115 may be coupled between the SPAD sensor 110 and the processor 120.

Referring to both FIG. 6A, the row select circuit 112 may be configured to select a row of the SPADs of the SPAD array according to a row selection signal (not shown). The row selection signal may be generated by a clock circuit, a driver, a selection circuit or another suitable controlling device. Once the row of SPADs are selected, the row of SPADs may be enabled to receive the reflective light L2 from the optical system OS and column by column output the reflective light L2 to the TDC 115. The TDC 115 may be configured to output the original data D0 based on the reflective light L2 to the processor 120. For example, the TDC 115 may be configured to detect a timing of the reflect light L2 and convert the original data from a time-based data into a distance-based data. It is noted that, while it is depicted for the sake of convenience in explanation that the SPAD array 110, the row select circuit 112, and the TDC 115 are depicted separately, the row select circuit 112 and the TDC 115 may be integrated in the SPAD array 110 or disposed outside the SPAD array 110. That is, this disclosure does not limit the SPAD array 110, the row select circuit 112, and the TDC 115 are integrated together or disposed separately.

In one embodiment, the processor 120 may be configured to utilize a histogrammer to categorize the original data D0 so as to present the original data D0 as a histogram (such as the histogram 200). The histogrammer may be achieved as a program code executed by the processor 120 or a circuit coupled to the processor 120, but this disclosure does not limited thereto. The horizontal axis of the histogram may represent a distance from the dTOF detecting device 100 to the object OBJ. The vertical axis of the histogram may represent a population (count) of the data at a certain distance. Similar to the histogram 200 of FIG. 2, in the histogram of FIG. 6A, by setting the minimum distance Dmin, the maximum distance Dmax (i.e., the gating range GR), and the saturation distance Dsat, the original data D0 may be categorized into the valid part (the depth data D1) and the invalid part (the intensity data D2).

The valid part (the depth data D1) of the original data D0 may be processed by the depth data extraction process 310 to obtain the depth image 302. The invalid part (the intensity data D2) of the original data D0 may be processed by the intensity data extraction process 410 to obtain the intensity image 402. The details of the depth data extraction process 310, depth image 302, intensity data extraction process 410, and the intensity image 402 may be refereed to descriptions of FIG. 3 and FIG. 4, while the details are not redundantly described seriatim herein.

Referring to FIG. 6B and FIG. 6C, a data flow diagram 600B schematically depicts how the data is obtained and processed by the dTOF detecting device 100 and a flowchart 600C schematically depicts steps processed by the dTOF detecting system 10.

In one embodiment, the light source LS of the dTOF detecting system 10 may be a NIR pulse laser and the optical system OS may be a NIR filtered lens optics system. In a step S610, the NIR pulse laser and the NIR filtered lens optics system may be setup manually or automatically. The NIR pulse laser may be configured to emit the incident light L1 towards the object OBJ. The NIR filtered lens optics system may be configured to receive the reflective light L2 after the incident light L1 being reflected by the object OBJ and provide the reflective light L2 to the SPAD sensor 110.

The NIR pulse laser may be configured to emit the incident light L1 frame by frame for the first number (the frame number) of times. In other words, each frame may indicate one incident light L1 is emitted and each frame may be also consider as a detection period of the dTOF detecting device 100 or the dTOF detecting system.

In a step S620, the NIR filtered lens optics system may be configured to receive the reflective light L2 for the first number of frames and provide the reflective light L2 to the SPAD sensor 110. The SPAD sensor 110 may be configured to output dTOF raw data (the original data D0) based on the reflective light L2 to the TDC 115. Then, the TDC 115 may be configured to convert the original data D0 from a time-based data into a distance-based data and provide the original data D0 to the processor 120. The processor 120 may be configured to pre-process the dTOF raw data (the original data D0) according to TCSPC methodology to present the dTOF raw data (the original data D0) in the histogram format.

In a step S630, the processor 120 may be configured to extract the depth data D1 from the original data D0. This process may be also called gating the histogram data (the original data D0). Then, the processor 120 may be configured to perform the depth data extraction process 310 to generate the depth image 302.

In a step S640, the processor 120 may be configured to extract the intensity data D2 from the original data D0. This process may be also called gating the histogram data (the original data D0). Then, the processor 120 may be configured to perform the intensity data extraction process 410 to generate the intensity image 402.

In this manner, the dTOF detecting device 100 or the dTOF detecting system is able to perform both the depth sensing and the image sensing simultaneously, thereby saving the processing time and increasing the performance of the whole system. That is, a dual purpose data processor for dTOF detecting may be achieved.

Figure 7A:
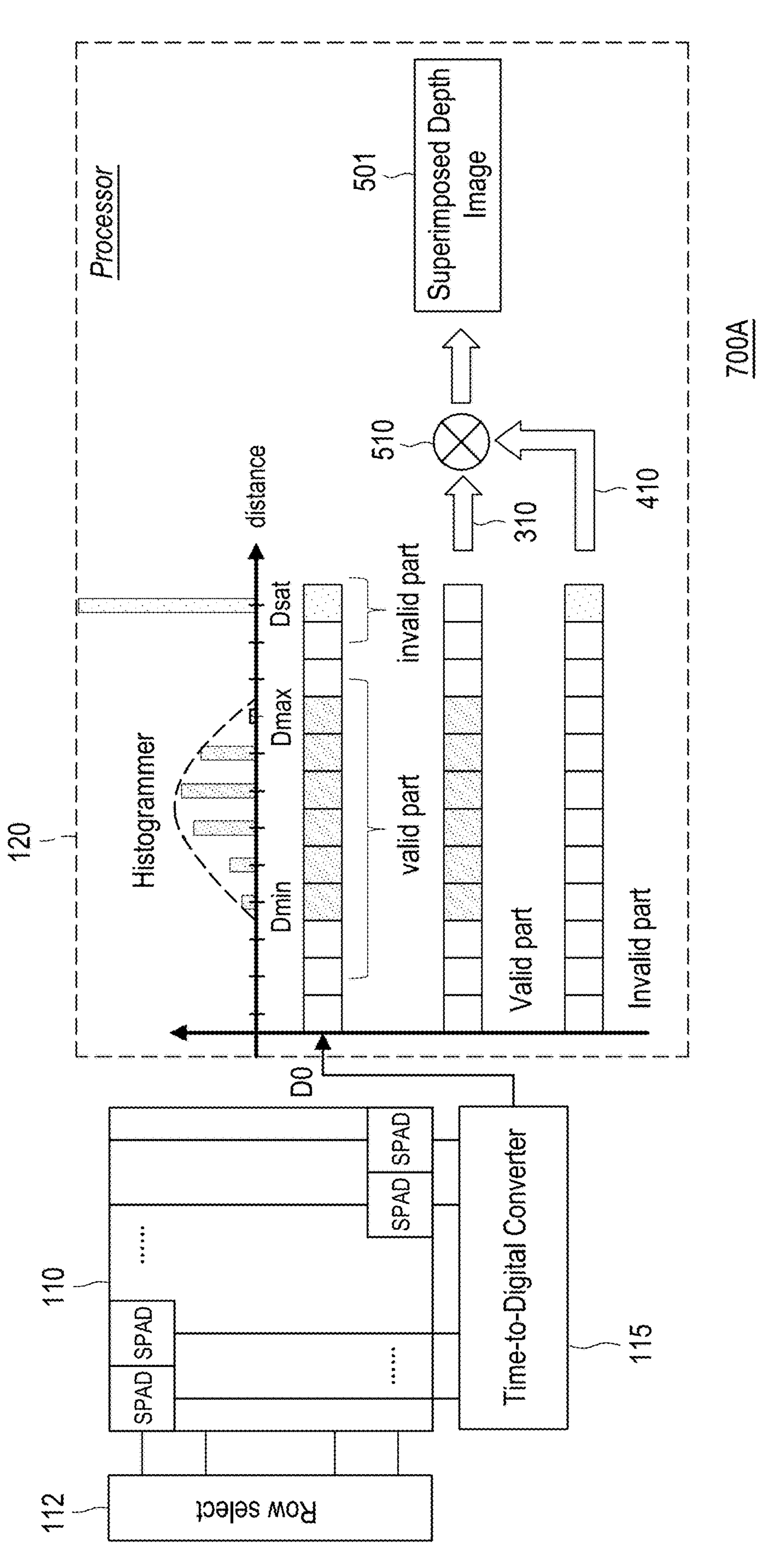
FIG. 7A is a schematic circuit structure of a dTOF detecting device to an embodiment of the disclosure.
Figure 7B:
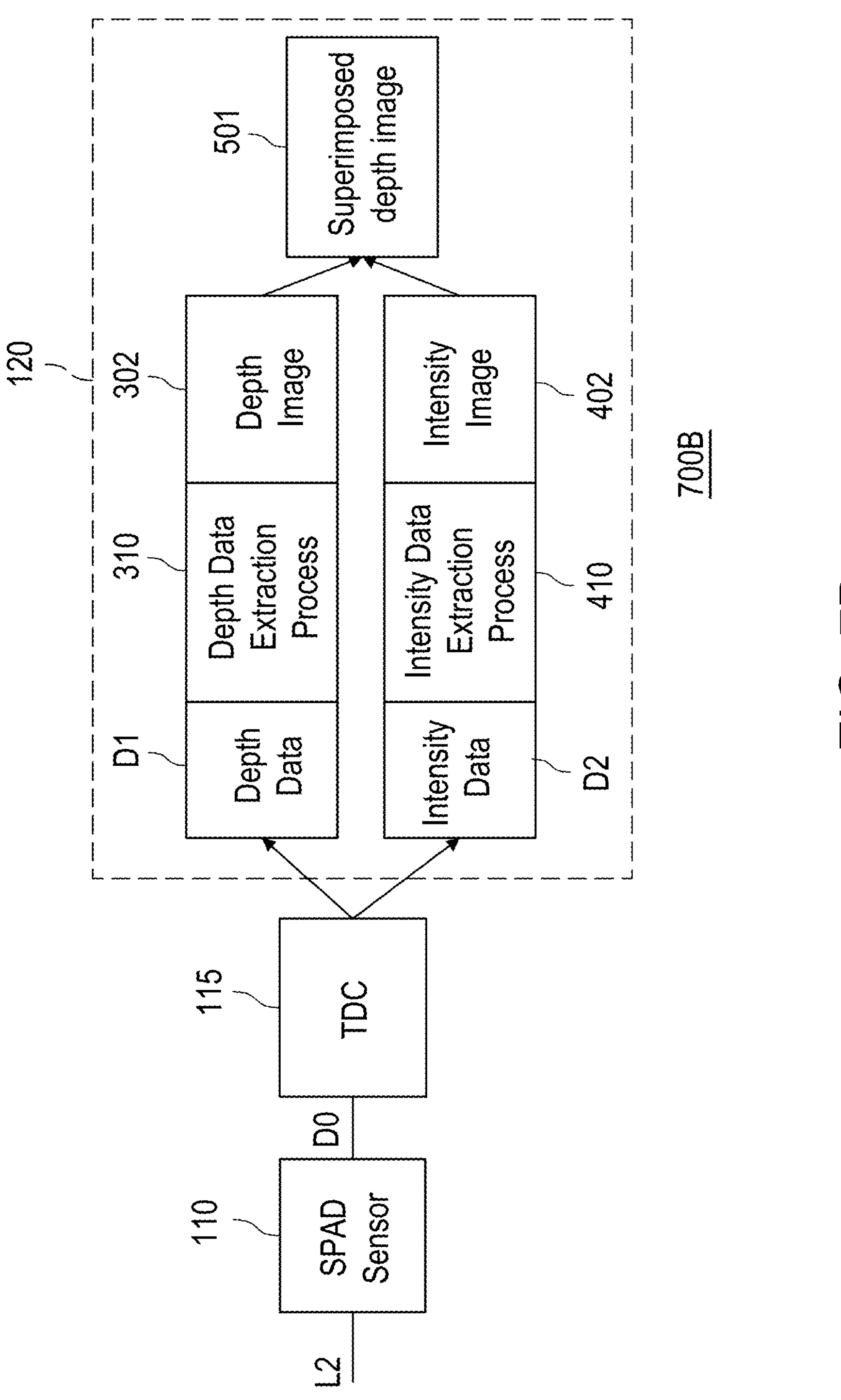
FIG. 7B is a schematic block diagram of a dTOF detecting device to an embodiment of the disclosure.
Figure 7C:
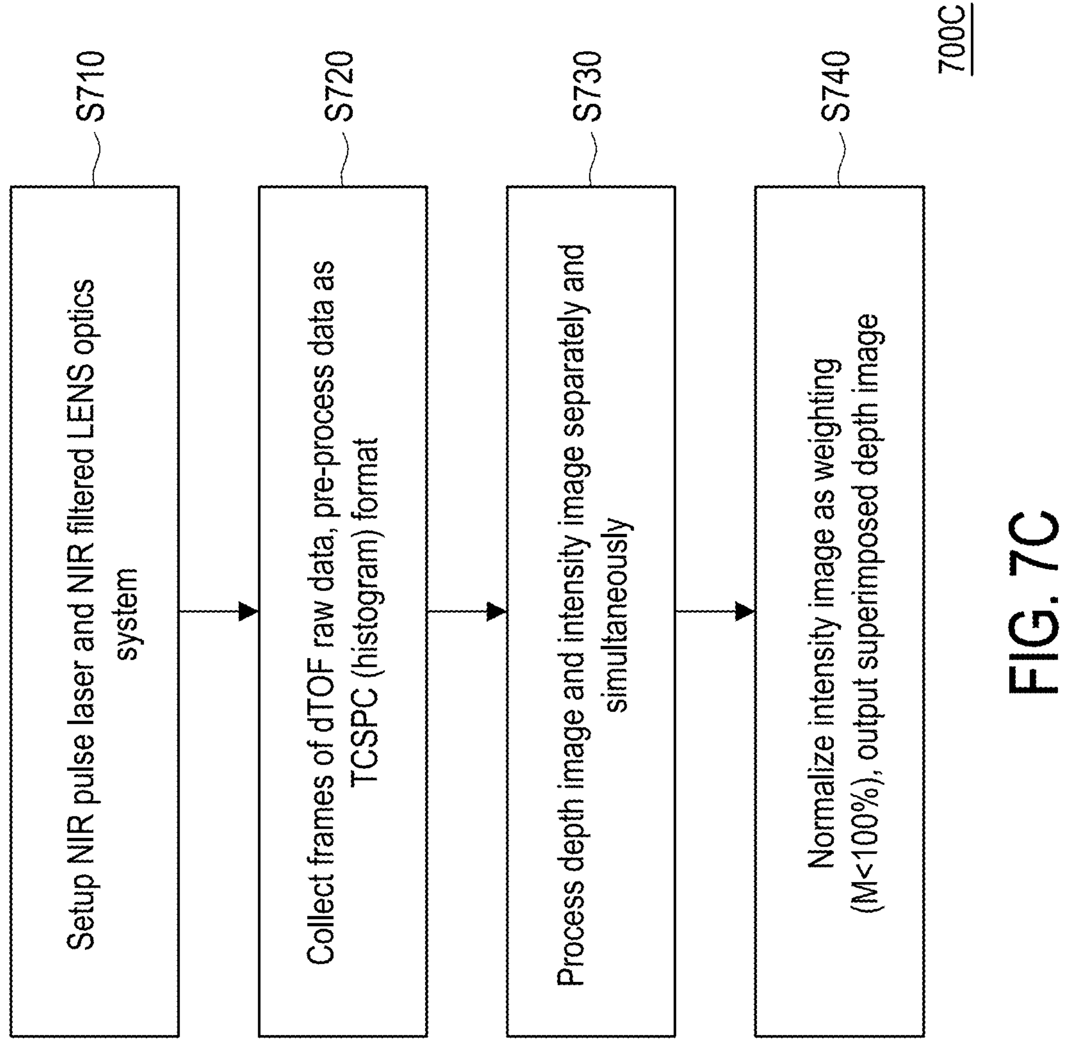
FIG. 7C is a schematic flowchart of a dTOF detecting device to an embodiment of the disclosure.

FIG. 7A is a schematic circuit structure of a dTOF detecting device to an embodiment of the disclosure. FIG. 7B is a schematic block diagram of a dTOF detecting device to an embodiment of the disclosure. FIG. 7C is a schematic flowchart of a dTOF detecting device to an embodiment of the disclosure.

Referring to FIG. 6A to FIG. 7C, comparing with FIG. 6A to FIG. 6C, in FIG. 7A to FIG. 7C, the processor 120 may be further configured to perform the superimposing process 510 to superimpose the depth image 302 and the intensity image 402 so as to generate the superimposed depth image 501. That is, a circuit structure 700A may be configured to not only generate the depth image 302 and the intensity image 402, but also generate the superimposed depth image 501.

Further, a data flow diagram 700B schematically depicts how the data is obtained and processed by the dTOF detecting device 100 and a flowchart 700C schematically depicts steps processed by the dTOF detecting system 10.

It is noted that, the implementation details of the circuit structure 700A, the data flow diagram 700B, and the flowchart 700C may be referred to the descriptions of FIG. 6A to FIG. 6C to obtain sufficient teachings, suggestions, and implementation embodiments, while the details are not redundantly described seriatim herein.

In this manner, the dTOF detecting device 100 or the dTOF detecting system is able to provide a superimposed depth image 501 with both the depth information and the grayscale information. That is, the details of the depth image 302 may be enhanced by the two-dimensional image of the intensity image 402 so as to generate the superimposed depth image 501. Therefore, the dTOF detecting device 100 or the dTOF detecting system 10 may be applied to wide applications.

Figure 8:
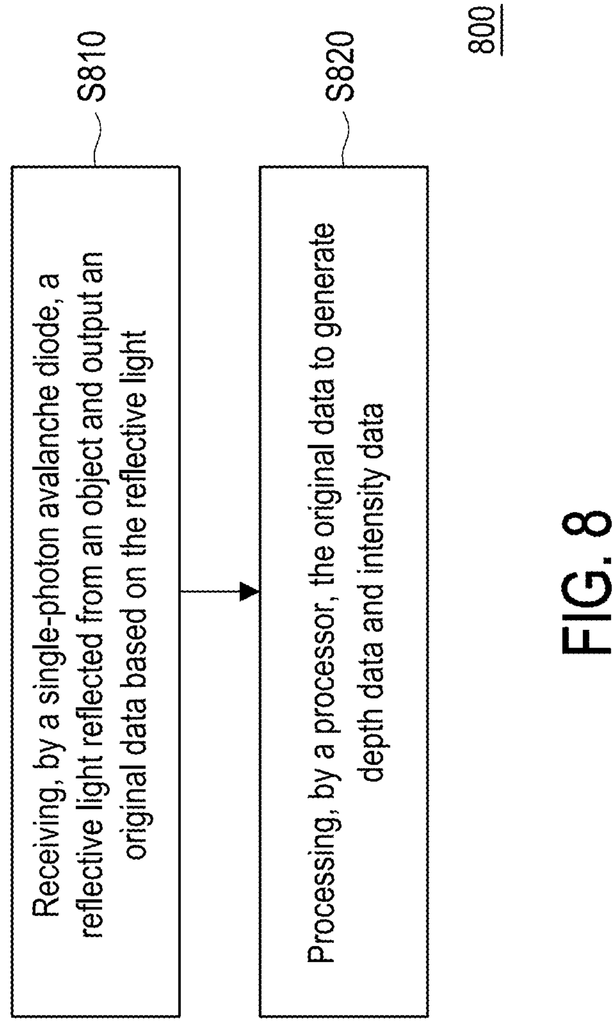
FIG. 8 is a schematic flowchart of a dTOF detecting method to an embodiment of the disclosure.

FIG. 8 is a schematic flowchart of a dTOF detecting method to an embodiment of the disclosure. With reference to FIG. 1 to FIG. 6, a dTOF detecting method 800 may include a step S810 and a step S820.

In the step S810, the reflective light L2 reflected from the object OBJ may be received by the SPAD sensor 110 and the original data D0 may be outputted based on the reflective light L2.

In the step S820, the original data D0 may be processed by the processor 120 to generate the depth data D1 and the intensity data D2.

It is noted that, the implementation details of the dTOF detecting method 800 may be referred to the descriptions of FIG. 1 to FIG. 7C to obtain sufficient teachings, suggestions, and implementation embodiments, while the details are not redundantly described seriatim herein.

In this manner, the dTOF detecting device 100 is able to perform both the depth sensing and the image sensing simultaneously, thereby saving the processing time and increasing the performance of the whole system.

In summary, according to the dTOF detecting device 100, the dTOF detecting system 10, and the dTOF detecting method 800, both the depth sensing and the image sensing may be obtained simultaneously, thereby achieving a dual purpose data processor for dTOF detecting. Further, the details of the depth image 302 may be enhanced by the two-dimensional image of the intensity image 402 so as to generate the superimposed depth image 501. Therefore, the dTOF detecting device 100 or the dTOF detecting system 10 may be applied to wide applications.

In one embodiment, the direct-time-of-flight (dTOF) detecting device includes a single-photon avalanche diode (SPAD) sensor and a processor. The SPAD sensor is configured to receive a reflective light reflected from an object and output an original data based on the reflective light. The processor is coupled to the SPAD sensor and configured to process the original data to generate depth data and intensity data. The depth data includes depth information of the object and the intensity data includes a two-dimensional image of the object.

In a related embodiment, the processor is further configured to: filter the original data within a gating range to generate the depth data; and filter the original data outside the gating range to generate the intensity data.

In a related embodiment, the gating range includes a maximum distance and a minimum distance, and the maximum distance and the minimum distance are predetermined based on a detecting distance of the dTOF detecting device.

In a related embodiment, the gating range is includes a maximum distance and a minimum distance. The processor is further configured to: detect a profile distribution after histogramming the original data; and determine the maximum distance and the minimum distance according to two boundaries of the profile distribution.

In a related embodiment, the processor is further configured to: detect a saturation peak count near the end of the original data; and determine the saturation peak as the intensity data.

In a related embodiment, the original data includes a first number of the reflective lights received by the SPAD sensor frame by frame. The first number of the reflective lights include a second number of the reflective lights triggering the avalanche of the SPAD sensor and a third number of the reflective lights may not triggering the avalanche of the SPAD sensor. The processor is further configured to: obtain an invalid rate by dividing the third number by the first number; and calibrate the intensity data based on the invalid rate.

In a related embodiment, the original data includes a valid part and an invalid part. The valid part is configured to indicate the SPAD sensor is avalanched. The invalid part is configured to indicate the SPAD sensor is not avalanched. The depth data is generated based on the valid data, and the intensity data is generated based on the invalid data.

In a related embodiment, the processor is further configured to: generate a superimposed depth image of the object by superimposing the depth information of the object with the two-dimensional image of the object.

In a related embodiment, the SPAD sensor includes a plurality of pixels. The processor is further configured to: obtain a superimposed depth value of each pixel by multiplying a detected distance of the depth image by a grayscale value of the intensity image pixel by pixel; and generate the superimposed depth image based on the superimposed depth values of the pixels.

In a related embodiment, the dTOF detection device further includes a time-to-digital converter (TDC), coupled between the SPAD sensor and the processor and configured to: convert the original data from a time-based data into a distance-based data; and output the original data to the SPAD sensor.

In one embodiment, the dTOF detecting system includes a light source, an optical system, a SPAD sensor, a processor. The light source is configured to emit an incident light to an object. The optical system is configured to receive the reflective light after the incident light being reflected by the object and output the reflective light. The SPAD sensor is configured to receive the reflective light from the optical system and output an original data based on the reflective light. The processor is coupled to the SPAD sensor and configured to process the original data to generate depth data and intensity data. The depth data includes depth information of the object and the intensity data includes a two-dimensional image of the object.

In a related embodiment, the light source is a near infrared laser source.

In a related embodiment, the optical system includes at least one of a lens, a complementary metal oxide semiconductor (CMOS) camera, and a charge coupled system (CCD) camera.

In a related embodiment, the processor is further configured to: filter the original data within a gating range to generate the depth data; and filter the original data outside the gating range to generate the intensity data.

In a related embodiment, the gating range includes a maximum distance and a minimum distance, and the maximum distance and the minimum distance are predetermined based on a detecting distance of the dTOF detecting system.

In a related embodiment, the gating range is includes a maximum distance and a minimum distance. The processor is further configured to: detect a profile distribution after histogramming the original data; and determine the maximum distance and the minimum distance according to two boundaries of the profile distribution.

In a related embodiment, the processor is further configured to: detect a saturation peak count near the end of the original data; and determine the saturation peak as the intensity data.

In a related embodiment, the original data includes a first number of the reflective lights. The first number of the reflective lights include a second number of the reflective lights triggering the avalanche of the SPAD sensor and a third number of the reflective lights may not triggering the avalanche of the SPAD sensor. The processor is further configured to: obtain an invalid rate by dividing the third number by the first number; and calibrate the intensity data based on the invalid rate.

In a related embodiment, the original data includes a valid part and an invalid part. The valid part is configured to indicate the SPAD sensor is avalanched. The invalid part is configured to indicate the SPAD sensor is not avalanched. The depth data is generated based on the valid data, and the intensity data is generated based on the invalid data.

In one embodiment, the dTOF detecting method includes following steps: receiving, by a single-photon avalanche diode, a reflective light reflected from an object and output an original data based on the reflective light; and processing, by a processor, the original data to generate depth data and intensity data, wherein the depth data includes depth information of the object and the intensity data includes a two-dimensional image of the object.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A direct-time-of-flight (dTOF) detecting device, comprising:

a single-photon avalanche diode (SPAD) sensor, configured to receive a reflective light reflected from an object and output an original data based on the reflective light; and a processor, coupled to the SPAD sensor and configured to process the original data to generate depth data and intensity data, wherein the depth data comprises depth information of the object and the intensity data comprises a two-dimensional image of the object, wherein the processor is configured to:

filter the original data within a gating range to generate the depth data; and filter the original data outside the gating range to generate the intensity data.

2. The dTOF detecting device according to claim 1, wherein the gating range comprises a maximum distance and a minimum distance, and the maximum distance and the minimum distance are predetermined based on a detecting distance of the dTOF detecting device.

3. The dTOF detecting device according to claim 1, wherein the gating range comprises a maximum distance and a minimum distance, and the processor is further configured to:

detect a profile distribution after histogramming the original data; and determine the maximum distance and the minimum distance according to two boundaries of the profile distribution.

4. The dTOF detecting device according to claim 1, wherein the processor is further configured to:

detect a saturation peak count near an end of the original data; and determine the saturation peak as the intensity data.

5. The dTOF detecting device according to claim 1, wherein the original data comprises a first number of the reflective lights received by the SPAD sensor frame by frame, the first number of the reflective lights comprise a second number of the reflective lights triggering the avalanche of the SPAD sensor and a third number of the reflective lights not triggering the avalanche of the SPAD sensor, the processor is further configured to:

obtain an invalid rate by dividing the third number by the first number; and calibrate the intensity data based on the invalid rate.

6. The dTOF detecting device according to claim 1, wherein the original data comprises a valid part and an invalid part, the valid part is configured to indicate the SPAD sensor is avalanched, the invalid part is configured to indicate the SPAD sensor is not avalanched, the depth data is generated based on the valid data, and the intensity data is generated based on the invalid data.

7. The dTOF detecting device according to claim 1, wherein the processor is further configured to:

generate a superimposed depth image of the object by superimposing the depth information of the object with the two-dimensional image of the object.

8. The dTOF detecting device according to claim 7, wherein the SPAD sensor comprises a plurality of pixels, the processor is further configured to:

obtain a superimposed depth value of each pixel by multiplying a detected distance of the depth image by a grayscale value of the intensity image pixel by pixel; and generate the superimposed depth image based on the superimposed depth values of the pixels.

9. The dTOF detecting device according to claim 1, further comprising:

a time-to-digital converter (TDC), coupled between the SPAD sensor and the processor and configured to:

convert the original data from a time-based data into a distance-based data; and output the original data to the SPAD sensor.

10. A dTOF detecting system, comprising:

a light source, configured to emit an incident light to an object;

an optical system, configured to receive the reflective light after the incident light being reflected by the object and output the reflective light;

a single-photon avalanche diode (SPAD) sensor, configured to receive the reflective light from the optical system and output an original data based on the reflective light; and a processor, coupled to the SPAD sensor and configured to process the original data to generate depth data and intensity data, wherein the depth data comprises depth information of the object and the intensity data comprises a two-dimensional image of the object, wherein the processor is configured to:

filter the original data within a gating range to generate the depth data; and filter the original data outside the gating range to generate the intensity data.

11. The dTOF detecting system according to claim 10, wherein the light source is a near infrared laser source.

12. The dTOF detecting system according to claim 10, wherein the optical system comprises at least one of a lens, a complementary metal oxide semiconductor (CMOS) camera, and a charge coupled system (CCD) camera.

13. The dTOF detecting system according to claim 10, wherein the gating range comprises a maximum distance and a minimum distance, and the maximum distance and the minimum distance are predetermined based on a detecting distance of the dTOF detecting system.

14. The dTOF detecting system according to claim 10, wherein the gating range comprises a maximum distance and a minimum distance, and the processor is further configured to:

detect a profile distribution after histogramming the original data; and determine the maximum distance and the minimum distance according to two boundaries of the profile distribution.

15. The dTOF detecting system according to claim 10, wherein the processor is further configured to:

detect a saturation peak count near an end of the original data; and determine the saturation peak as the intensity data.

16. The dTOF detecting system according to claim 10, wherein the original data comprises a first number of the reflective lights, the first number of the reflective lights comprise a second number of the reflective lights triggering the avalanche of the SPAD sensor and a third number of the reflective lights not triggering the avalanche of the SPAD sensor, the processor is further configured to:

obtain an invalid rate by dividing the third number by the first number; and calibrate the intensity data based on the invalid rate.

17. The dTOF detecting system according to claim 10, wherein the original data comprises a valid part and an invalid part, the valid part is configured to indicate the SPAD sensor is avalanched, the invalid part is configured to indicate the SPAD sensor is not avalanched, the depth data is generated based on the valid data, and the intensity data is generated based on the invalid data.

18. A dTOF detecting method, comprising:

receiving, by a single-photon avalanche diode, a reflective light reflected from an object and output an original data based on the reflective light; and processing, by a processor, the original data to generate depth data and intensity data, wherein the depth data comprises depth information of the object and the intensity data comprises a two-dimensional image of the object, wherein the processing comprises filtering the original data within a gating range to generate the depth data, and filtering the original data outside the gating range to generate the intensity data.

19. The dTOF detecting method according to claim 18, wherein the gating range comprises a maximum distance and a minimum distance, and the maximum distance and the minimum distance are predetermined based on a detecting distance of the dTOF detecting device.

20. The dTOF detecting method according to claim 18, wherein the gating range comprises a maximum distance and a minimum distance, and the processing further comprises detecting a profile distribution after histogramming the original data, and determining the maximum distance and the minimum distance according to two boundaries of the profile distribution.

* * * * *